Aug. 12, 1958  M. P. SCHIRA, JR  2,846,953
REVERSIBLE PUMP FOR USE IN A HYDRAULIC TORQUE CONVERTER
Filed July 9, 1954  3 Sheets-Sheet 1

INVENTOR.
MARTIN P. SCHIRA JR.
BY
McMorrow, Berman + Davidson
ATTORNEYS

Aug. 12, 1958     M. P. SCHIRA, JR     2,846,953
REVERSIBLE PUMP FOR USE IN A HYDRAULIC TORQUE CONVERTER
Filed July 9, 1954     3 Sheets-Sheet 2
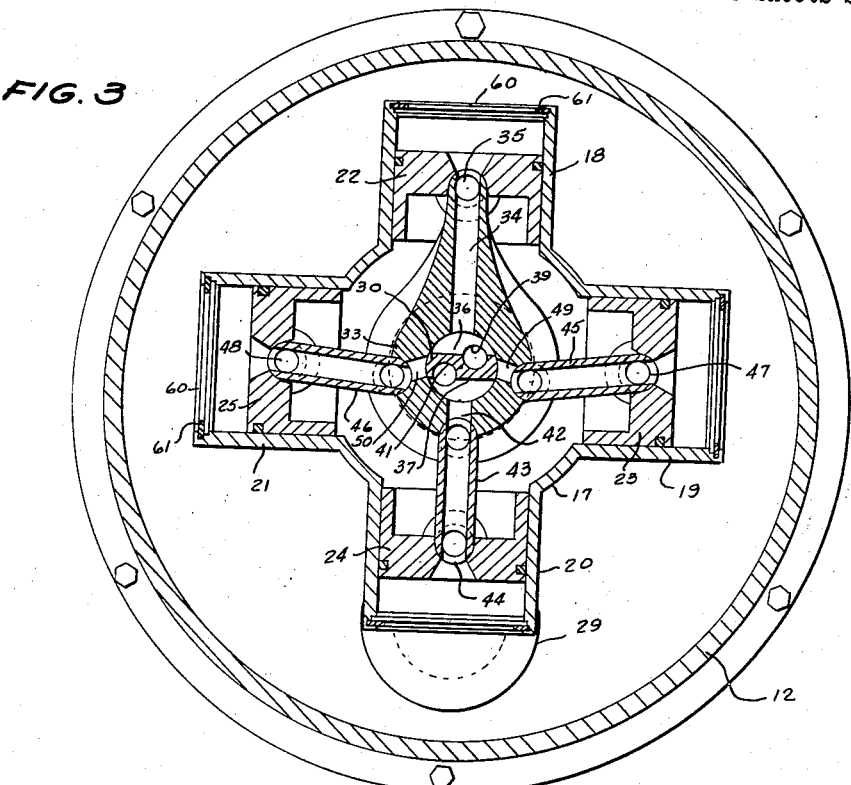
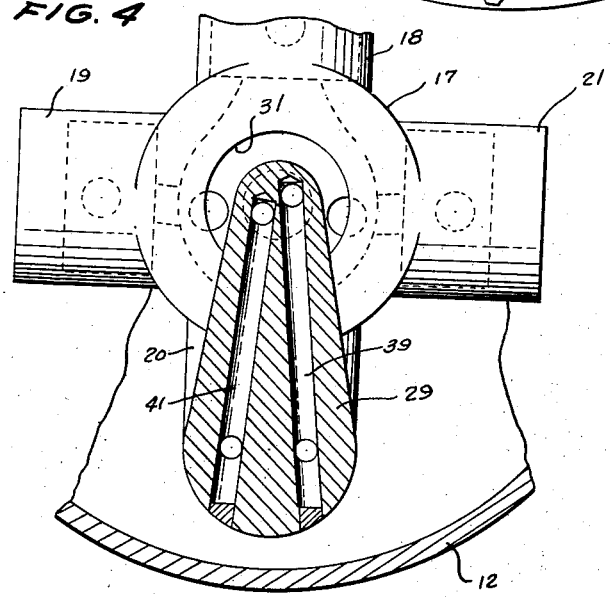
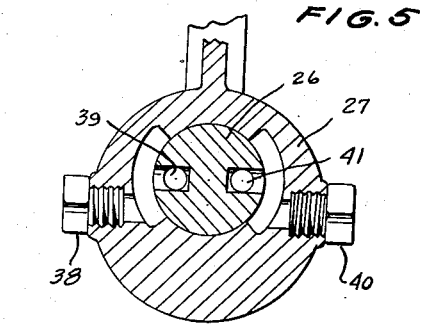
INVENTOR.
MARTIN P. SCHIRA JR.
BY
McMorrow, Berman + Davidson
ATTORNEYS Aug. 12, 1958     M. P. SCHIRA, JR     2,846,953
REVERSIBLE PUMP FOR USE IN A HYDRAULIC TORQUE CONVERTER
Filed July 9, 1954     3 Sheets—Sheet 3
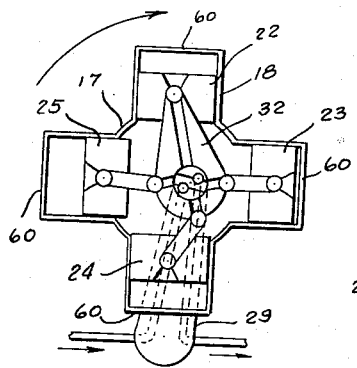
FIG. 7-A
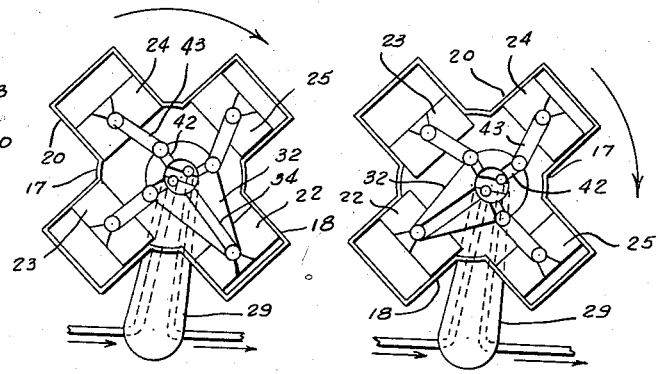
FIG. 7-B     FIG. 7-C
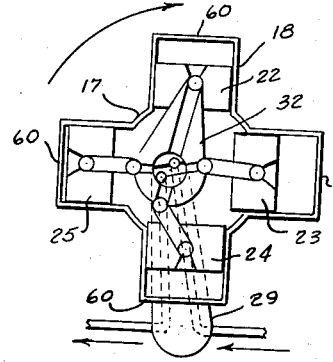
FIG. 8-A
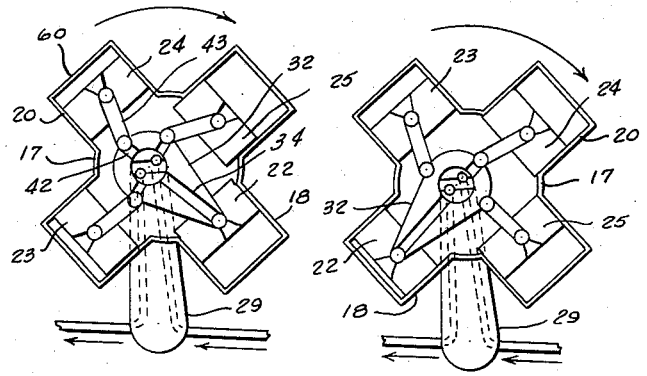
FIG. 8-B     FIG. 8-C
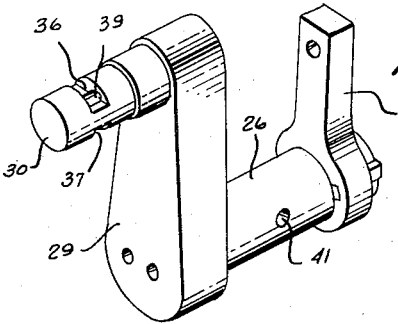
FIG. 6
INVENTOR.
MARTIN P. SCHIRA JR.
BY
McMorrow, Berman + Davidson
ATTORNEYS

United States Patent Office 2,846,953
Patented Aug. 12, 1958

2,846,953

REVERSIBLE PUMP FOR USE IN A HYDRAULIC TORQUE CONVERTER

Martin P. Schira, Jr., Spring Lake Heights, N. J.

Application July 9, 1954, Serial No. 442,266

2 Claims. (Cl. 103—161)

This invention relates to hydraulic power transmission units, and more particularly to an improved variable displacement for use in a hydraulic torque converter pump.

A main object of the invention is to provide a novel and improved hydraulic pump for use in a hydraulic torque converter which is simple in construction, which operates as a means of transmission of power from a driving shaft to a hydraulically driven member, which is arranged for smooth variation of output and for variation of speed of the driven member, and for reversal of action whenever desired.

A further object of the invention is to provide an improved variable displacement pump for use in a hydraulic torque converter which is inexpensive to fabricate, which is durable in construction, which is arranged so that its output can be controlled smoothly from zero to full capacity thereof, which is arranged to provide reversal of action, so that the direction of fluid flow therethrough can be readily reversed whenever desired, and which involves only a few parts.

Further objects and advantages of the invention will become apparent from the following description and claims, and from the accompanying drawings, wherein:

Figure 3 is a vertical cross sectional view taken on the line 3—3 of Figure 2.

Figure 4 is a cross sectional detail view taken on the line 4—4 of Figure 2.

Figure 5 is a cross sectional detail view taken on the line 5—5 of Figure 2.

Figure 6 is a perspective view of the control shaft, control arm and crank pin employed in the torque converter pump of Figures 1 to 5.

Figure 1:
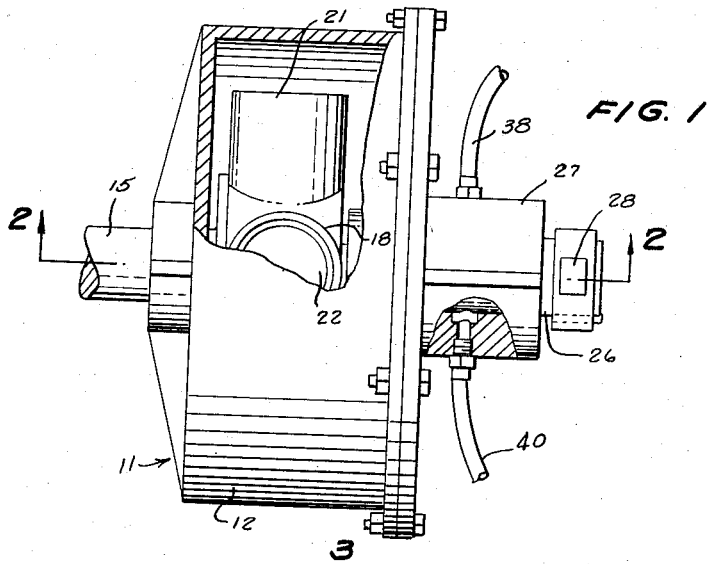
Figure 1 is a top plan view, partly in horizontal cross section, of an improved variable displacement pump for a hydraulic torque converter constructed in accordance with the present invention.

Figure 7-A is a diagrammatic view showing the positions of the pistons in the cylinders of the torque converter pump of Figures 1 to 6 at the beginning of a cycle of forward propulsion.

Figure 7-B is a view similar to Figure 7-A and showing the pistons after the crank arm of the torque converter pump has been rotated through approximately 120° from the starting position of Figure 7-A.

Figure 7-C is a diagrammatic view similar to Figure 7-B but showing the crank arm rotated through an angle of approximately 120° from the position shown in Figure 7-B.

Figure 8-A is a diagrammatic view similar to Figure 7-A but showing the torque converter pump adjusted for reverse pumping action relative to the arrangement of Figure 7-A.

Figure 8-B is a diagrammatic view similar to Figure 7-B and showing the crank arm after rotation of approximately 120° from the position thereof shown in Figure 8-A.

Figure 8-C is a diagrammatic view similar to Figure 7-C but showing the crank arm of the torque converter pump rotated through an angle of approximately 120° from the position thereof shown in Figure 8-B.

Referring to the drawings, the variable displacement torque converter pump is designated generally at 11 and comprises a fluid housing 12 having the parallel front and rear walls 13 and 14. Designated at 15 is a power input shaft which is journaled at 16 in the front wall 13. Rigidly secured to the end of the power input shaft 15 is the cylinder housing member 17, said cylinder housing member being formed with a plurality of equally spaced, radially extending cylinders 18, 19, 20 and 21, four cylinders being shown by way of example, and the cylinders being spaced at equal angles around the axis of the power input shaft 15. The outer end of each cylinder 18, 19, 20, and 21 is sealed by means of a circular sealing plate 60 held in place by a lock ring 61.

Slidably disposed in the respective cylinders 18 to 21 are the respective pistons 22, 23, 24 and 25, as shown.

Designated at 26 is a displacement control shaft which is rotatably mounted in a bearing sleeve 27 formed integrally with the rear wall 14, the shaft 26 having secured to its outer end the displacement control lever 28. Rigidly secured to the inner end of the displacement control shaft 26 is the arm 29, said arm extending perpendicular to the shaft 26 and being formed at its end with the crank pin 30 which projects into the cylinder housing 17 through an aperture 31 formed in the wall of said cylinder housing.

Secured to the piston 22 is an axial piston rod 32, said piston rod 32 being formed with the hub 33 rotatably engaged on the crank pin 30. The piston rod 32 is formed with an axial passage 34 which communicates with an axial passage 35 formed in the piston 22. The crank pin 30 is formed with opposing transversely extending grooves 36 and 37 arranged to alternately communicate with the passage 34 as the piston rod 32 and the associated piston 22 are rotated around the axis of shaft 15 by the rotation of the cylinder housing 17 by said shaft 15.

Designated at 38 is a fluid conduit which is connected to the bearing sleeve 27 and which communicates with a passage 39 which extends through shaft 26, arm 29, and crank pin 30 and which communicates with the transverse groove 36 in said crank pin. Designated at 40 is a fluid outlet conduit which is connected to the bearing sleeve 27 opposite the inlet conduit 38 and which communicates with a passage 41 extending through shaft 26, arm 29 and crank pin 30 and communicating with the transverse groove 37 in said crank pin.

Figure 2:
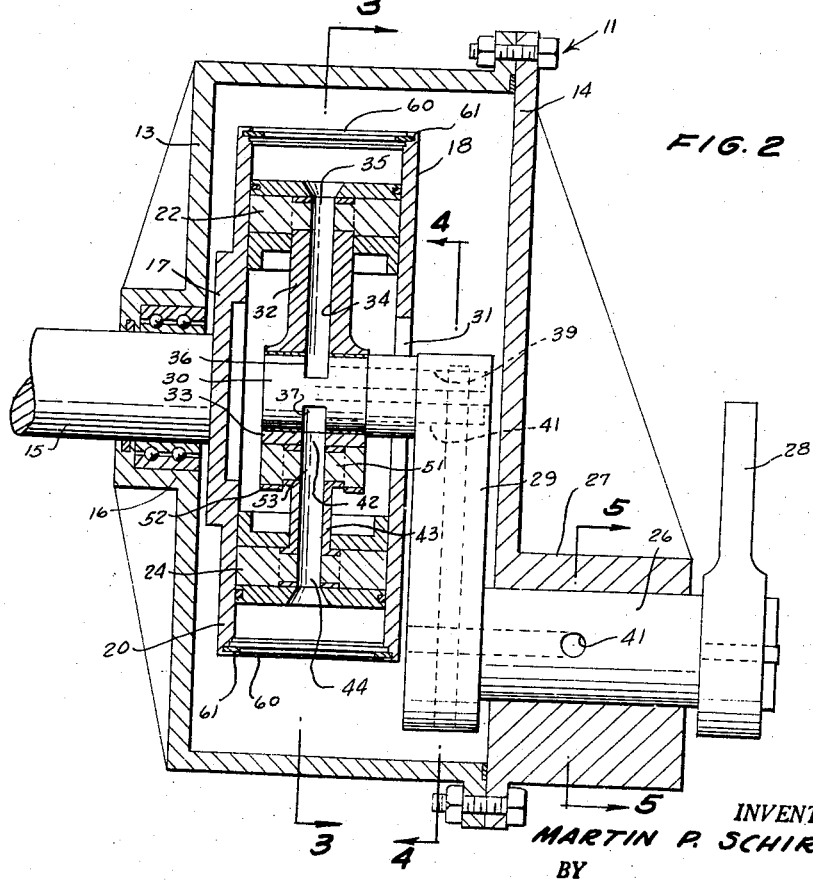
Figure 2 is an enlarged vertical cross sectional view taken on the line 2—2 of Figure 1.

The hub 33 is formed opposite the passage 34 with an aperture 42 which, in the position of the elements shown in Figure 2, communicates with the sealed outer end of cylinder 20 through a tubular link 43 pivotally connected to hub 33 and through an axial passage 44 in the piston 24, the tubular link 43 being connected to the piston 24, as shown in Figure 2, whereby piston 24 is rotated along with piston 22 and is reciprocated in its cylinder 20 simultaneously with the reciprocation of piston 22 in its cylinder 18, but in opposite phase with respect thereto.

Respective tubular links 45 and 46 connect pistons 23 and 25 to the hub 33 of arm 32, each of the pistons being formed with axial bores, shown at 47 and 48, similar to the axial bores 35 and 44 in the pistons 22 and 24. The hub 33 is formed with respective passages 49 and 50, similar to the passage 42, connecting the respective tubular links 45 and 46 to the bore portion of hub 33 communicating with the transverse grooves 36 and 37 of crank pin 30.

As shown in Figures 2 and 3, each of the tubular links is pivotally connected to a respective piston 23, 24 and 25. The inner ends of the respective links are rotatably connected to the hub member 33 by being rotatably engaged on pivot pins 51 which are secured to the hub 33, as by brackets 52. The pivot pins 51 are centrally apertured at 53 to establish communication between the tubular links and the passages 49, 42 and 50, and the transverse grooves 36 and 37.

It will be readily apparent that the position of the crank pin 30 is adjustable by means of the control lever 28, the pin 30 being rotatable around the axis of the control shaft 26 to vary the position of the piston rod hub element 33 in the cylinder housing 17. For example, in the position of pin 30 shown in Figures 2 and 3, the pin is in axial alignment with the shaft 15 so that the axis of rotation of the piston rod 32 and tubular links 45, 43 and 46 is the same as that of the power input shaft 15. Under these conditions, when the shaft 15 rotates, the cylinder housing 17 rotates simultaneously therewith, causing the respective cylinders 18 to 21 to rotate around the common axis of shaft 15 and pin 30. The pistons 22, 23, 24 and 25 also rotate, but since the axis of rotation of said pistons is the same as the axis of rotation of the cylinders 18, 19, 20 and 21, no displacement of the pistons in the cylinders occurs. Consequently, there is no pumping action and the fluid in the outlet conduit 40 will be at the same pressure as the fluid in the inlet conduit 38.

Assuming now that the control shaft 26 is rotated by the control lever 28 to a position wherein the pin 30 is displaced from the center position thereof in a direction to provide forward drive, for example, is displaced to the right from the position of Figure 3, as shown in Figure 7–A, namely, by a clockwise rotation of the arm 29 from its position shown in Figure 3, a clockwise rotation of the cylinder housing 17 causes the piston 22 to be moved outwardly from the position shown in Figure 7–A to the position shown in Figure 7—B during the first portion of the revolution of the cylinder housing 17, for example, through the initial 120° of rotation of the cylinder housing 17. During this portion of the movement of the cylinder housing 17 the pressure outwardly adjacent the piston 22 in the outer sealed end of cylinder 18 is being built up, and becomes a maximum as the arm 32 rotates to the position shown in Figure 7–B. As the arm 32 approaches the position of Figure 7–B, the passage 34 moves into communication with the lower groove 37 in pin 30, connecting the high pressure fluid region of the sealed outer end of cylinder 18 to the fluid outlet passage 41. At the same time, the passage 42 in hub 33 opposite arm 32 comes into communication with the upper groove 36 in pin 30, placing the tubular link 43 in communication with the fluid inlet passage 39. In this position, the piston 24, connected to link 43, is close to the innermost end of its stroke, producing minimum fluid pressure in the sealed outer end portion of the cylinder 20, namely, providing a negative pressure effect in this portion of the cylinder 20, whereas a positive pressure effect is produced in the outer end of the opposite cylinder 18 by the action of the piston 22.

As the housing 17 continues to rotate, namely, from the position of Figure 7–B to the position of Figure 7–C, the piston 22 is retracted and approaches the innermost end of its stroke substantially as the passage 34 is blanked by the portion of pin 30 at the end of the transverse groove 37 therein. While this is happening, the opposite piston 24 is being moved outwardly by its tubular link 43. Piston 24 reaches the outermost end of its stroke substantially when the passage 42, communicating with the tubular link 43, moves into communication with the lower transverse groove 37 in pin 30. At this time, the piston 22 is approximately at the innermost end of its stroke and passage 34 communicates with the upper groove 36 in pin 30, whereby a negative pressure is developed in the outer end portion of cylinder 18, which is placed in communication with the inlet passage 39, and a positive pressure is developed in the outer end of cylinder 20 which is placed in communication with the fluid outlet passage 41.

The pistons 23 and 25 and their associated cylinders 19 and 21 provide substantially the same action as described above in connection with the pistons 22 and 24 and their associated cylinders 18 and 20. Thus, with the control arm 29 rotated to the position shown in Figures 7–A, 7–B and 7–C, namely, clockwise from the position of Figure 3, negative pressure is produced in the fluid inlet conduit 38 by the transverse upper groove 36 in crank pin 30. Positive pressure is produced in the outlet conduit 40 by the lower transverse groove 37 in pin 30. Since the displacement of the pistons in their respective cylinders, namely, their stroke lengths, is determined by the degree of eccentricity of the crank pin 30 with respect to the power input shaft 15, the pressure differential obtained between conduits 38 and 40 can be varied by varying the angular position of the arm 29, namely, by varying the position of the control lever 28.

The above described action can be reversed by rotating the arm 29 counterclockwise from the position of Figure 3, namely, to the position shown in Figures 8–A, 8–B and 8–C. With the arm 29 positioned as in Figure 8–A, the first portion of the rotation of the cylinder housing 17 causes the piston 22 to be retracted in its cylinder 18, as shown in Figure 8–B, wherein the cylinder housing 17 has been rotated approximately 120° from the position of Figure 8–A, producing a reduction in fluid pressure in the sealed outer end portion of the cylinder 18, which reduction in pressure is transmitted through the passage 34 to the lower groove 37 in pin 30 as passage 34 moves into communication with said groove 37. At the same time, the opposite piston 24 is being moved outwardly in its cylinder 20, causing a build up of pressure in the sealed outer end portion of cylinder 20, which build up of pressure is transmitted through the tubular link 43 to the upper groove 36 in pin 30 as passage 42 comes into communication with said upper groove 36. Thus, since the action of the remaining pistons 23 and 25 and their associated cylinders 19 and 21 is the same as the action produced by pistons 22 and 24 and their associated cylinders 18 and 20, this produces a pressure differential opposite to that described in connection with Figures 7–A, 7–B and 7–C, namely, reverses the action of the device. The degree of pressure differential can be adjusted, as above described, by varying the angular position of the arm 29 by means of control lever 28.

From the above it will be apparent that a device has been described which enables a wide range of pressure differentials to be obtained between the fluid conduits 38 and 40 and which also provides a means for reversing the pressure differentials available at said conduits. The device can be employed as a driving means to transmit power from the drive shaft 15 through a hydraulic system including a fluid pressure responsive driven element of any conventional construction which is connected to the conduits 38 and 40. The device may be employed to transmit power for use in vehicles, such as automobiles, trucks, and the like, whereby the advantages of a complete and continuous variation of speed may be obtained in a smooth and efficient manner. Since the range of variation may be accomplished from forward to reverse without gear changes, the device is especially applicable for use in connection with power tools and similar machinery where instant control of power is an important factor.

The power transmission device above described is also adaptable for use on aircraft and for marine power transmission, where instantaneous reverse action is required of the main driven member, such as of the aircraft propeller or of the screw propeller of a boat.

A further useful feature of the present invention resides in the fact that thrust is developed on the shaft 15 by the action of the centrifugal forces produced in the rotating cylinders having different quantities of oil therein.

During the pumping action, fluid is drawn into the rotating cylinders 18, 19, 20 and 21 in quantities determined by the setting of pin 30 with relation to the center of cylinder housing 17.

The greater distance the pin 30 is moved from the center of cylinder housing 17, the greater is the variation between the amounts of fluid in each cylinder as it rotates around pin 30.

The fluid in the cylinder, rotating through its arc of operation, produces outward thrust by centrifugal action. The cylinder with the greater amount of fluid creates the greater thrust. This opposes the reaction produced by the building up of pressure in the opposite cylinder, and tends to equalize the opposing outward forces acting on the housing 17.

Thus, the thrust created is proportioned to the amount of fluid contained in the cylinders as they rotate, and the speed of rotation, therefore, thrust is created in the direction of arcuate movement of the cylinders containing the largest amounts of fluid.

Reversal of the pumping action also reverses the direction of the thrust.

The amount of thrust is controlled by (1) the speed of rotation, and (2) the amount of piston movement in the rotating cylinders.

While a specific embodiment of an improved variable displacement hydraulic torque converter has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A variable displacement hydraulic pump comprising a housing having parallel front and rear walls, a power input shaft journaled in said front wall, oppositely directed radially extending first and second cylinders secured on said shaft in said housing, a piston in each cylinder, a displacement control shaft pivotally mounted in said rear wall, an arm secured perpendicular to said control shaft in said housing, a crank pin secured to the end of said arm, an axial piston rod connected to the piston of the first cylinder and pivotally connected to said crank pin, whereby the position of the piston in said first cylinder may be varied by rotating said control shaft, respective coextensive and identical fluid inlet and outlet passages formed in said control shaft, said last-named piston and rod being formed with an axial fluid passage, said control shaft, arm and pin being formed with respective fluid inlet and outlet passages opening at diametrically opposite sides of said pin and being alternately registrable with said axial fluid passage and being arranged to alternately connect the axial fluid passage to the inlet and outlet passages responsive to the rotation of said cylinder in the housing, the piston rod being formed with a port opposite the axial fluid passage, and means whereby the outlet passage is connected through said port to the second cylinder when the inlet passage is connected to said axial fluid passage, and vice versa.

2. A variable displacement hydraulic pump comprising a housing having parallel front and rear walls, a power input shaft journaled in said front wall, a first radially extending cylinder secured on said shaft in said housing, a piston in said cylinder, a displacement control shaft pivotally mounted in said rear wall, an arm secured perpendicular to said control shaft in said housing, a crank pin secured to the end of said arm, an axial piston rod secured to said piston and rotatably connected to said crank pin, whereby the position of the piston in said cylinder may be varied by rotating said control shaft, respective coextensive and identical fluid inlet and outlet passages formed in said control shaft, said piston and rod being formed with an axial fluid passage, said control shaft, arm and pin being formed with respective fluid inlet and outlet passages opening at diametrically opposite sides of said pin and being alternately registrable with said axial fluid passage and being arranged to alternately connect the axial fluid passage to the inlet and outlet passages responsive to the rotation of said cylinder in the housing, the piston rod being formed with a port opposite the axial fluid passage, means whereby the outlet passage is connected to said port when the inlet passage is connected to said axial fluid passage, and vice versa, a plurality of additional radial cylinders secured on said power input shaft in said housing and spaced at equal angles around the axis of said input shaft, respective pistons in said additional cylinders, said cylinders being arranged in aligned pairs, said last-named pistons being formed with axial fluid passages, and respective tubular links connecting said last-named pistons to the portion of said piston rod connected to said crank pin, said tubular links respectively communicating with the axial fluid passages in said last-named pistons, said rod portion being formed with respective passages connecting the tubular links to the open ends of the fluid inlet and outlet passages on the pin alternately responsive to the rotation of the cylinders in the housing.

References Cited in the file of this patent
UNITED STATES PATENTS

| | | |
|---|---|---|
| 1,308,436 | Maw et al. | July 1, 1919 |
| 1,320,485 | Maw et al. | Nov. 4, 1919 |
| 1,763,565 | Parker | June 10, 1930 |
| 1,778,238 | Wilsey | Oct. 14, 1930 |
| 2,392,754 | Mercier | Jan. 8, 1946 |
| 2,682,837 | Schira | July 6, 1954 |